United States Patent
Pawanekar et al.

(10) Patent No.: US 11,770,345 B2
(45) Date of Patent: Sep. 26, 2023

(54) DATA TRANSFER DEVICE FOR RECEIVING DATA FROM A HOST DEVICE AND METHOD THEREFOR

(71) Applicant: US Technology International Pvt. Ltd., Kerala (IN)

(72) Inventors: Sameer Sadashiv Pawanekar, Indore (IN); Upendra Narayan Tripathi, Bangalore (IN)

(73) Assignee: US TECHNOLOGY INTERNATIONAL PVT. LTD., Trivandrum (IN)

( * ) Notice: Subject to any disclaimer, the term of this patent is extended or adjusted under 35 U.S.C. 154(b) by 0 days.

(21) Appl. No.: 17/455,983

(22) Filed: Nov. 22, 2021

(65) Prior Publication Data

US 2023/0098946 A1 Mar. 30, 2023

(30) Foreign Application Priority Data

Sep. 30, 2021 (IN) .............................. 202141044462

(51) Int. Cl.
*H04L 47/62* (2022.01)
*H04L 47/32* (2022.01)

(52) U.S. Cl.
CPC .......... *H04L 47/6245* (2013.01); *H04L 47/32* (2013.01)

(58) Field of Classification Search
None
See application file for complete search history.

(56) References Cited

U.S. PATENT DOCUMENTS

| | | | |
|---|---|---|---|
| 10,523,576 B1 | 12/2019 | Matthews et al. | |
| 2002/0141450 A1* | 10/2002 | Duvvuru | H04L 9/40 370/476 |
| 2003/0018837 A1 | 1/2003 | Hussain et al. | |
| 2003/0223433 A1* | 12/2003 | Lee | H04L 69/32 370/469 |
| 2012/0131309 A1* | 5/2012 | Johnson | G06F 8/40 712/E9.004 |
| 2012/0250514 A1* | 10/2012 | Hiramoto | H04L 47/115 370/237 |
| 2019/0036847 A1* | 1/2019 | Kimoto | H04L 49/254 |
| 2019/0121553 A1 | 4/2019 | Himelstein et al. | |

* cited by examiner

*Primary Examiner* — Jason E Mattis
*Assistant Examiner* — Bao G Nguyen
(74) *Attorney, Agent, or Firm* — Workman Nydegger

(57) ABSTRACT

The present disclosure generally relates to data transfer device for receiving data from a host device and method therefor. The device comprise a plurality of input ports configured to receive input data comprising of a plurality of bytes, an output port configured to provide an output data byte and a plurality of buffer units, each buffer unit coupled to an input port of the plurality of input ports. Each of the plurality of buffer units receives a portion of the input data, wherein an enable bit is associated with the portion of data and each of the buffer devices provides the received portion of data as an output, if the enable bit indicates that the portion of data is not a garbage data.

12 Claims, 4 Drawing Sheets

DATA TRANSFER DEVICE FOR RECEIVING DATA FROM A HOST DEVICE AND METHOD THEREFOR

FIELD OF THE DISCLOSURE

The present disclosure generally relates to data transfer device for receiving data from a host device and a method therefor.

BACKGROUND

Data transfer devices are used to receive data from a host device and then transfer it to another device. For example, the host device could be a processor. Usually, the processor posts data using wide widths at input port of the data transfer device and disengages for a while until storage in the data transfer device becomes available. The input port of the data transfer device may be multiple byte widths. The input data comprises of multiple bytes and a byte enable may be associated with each byte which indicates if the byte is garbage or not. FIG. 1 illustrates an environment showing data transfer device in connection with a host device, in accordance with prior art. Let us consider that the processor posts an input/serial data on the input port of the data transfer device with multiple byte widths (lets say 32 bit=4 byte) along with byte enables (4 bit byte_enable signal for 32 bit port). Then, it is upto the device to discard the garbage data or not. Usually, if the byte_enable=0 for a given byte, it means that it is garbage data.

For storage efficiency, the garbage data should be discarded i.e. not stored in the data transfer device. However, in order to achieve the storage efficiency and discard of the unwanted bytes, extra clocks will be consumed per word of data, which makes the system slow. On the other hand, if device does not discard the garbage data and stores data, then the device is faster, but storage efficiency is affected.

Hence, there is a need for a data transfer device with improved storage efficiency and speed.

SUMMARY OF THE PRESENT DISCLOSURE

This summary is provided to introduce a selection of concepts, in a simplified format, that are further described in the detailed description of the invention. This summary is neither intended to identify key or essential inventive concepts of the invention and nor is it intended for determining the scope of the disclosure.

In an embodiment of the present disclosure, a data transfer device for receiving data from a host device, is disclosed. The device comprise a plurality of input ports configured to receive input data comprising of a plurality of bytes, an output port configured to provide an output data byte and a plurality of buffer units, each buffer unit coupled to an input port of the plurality of input ports. Each of the plurality of buffer units receives a portion of the input data, wherein an enable bit is associated with the portion of data and each of the buffer devices provides the received portion of data as an output, if the enable bit indicates that the portion of data is not a garbage data.

In an embodiment of the present disclosure, a method for receiving data from a host device, is disclosed. The method comprises receiving a portion of an input data at each of a plurality of buffer units, wherein the input data comprises of a plurality of bytes and wherein an enable bit is associated with the portion of data and providing, by each of the buffer devices, the received portion of data as an output at an output port, if the enable bit indicates that the portion of data is not a garbage data.

These and other features and advantages will be more clearly understood from the following detailed description taken in conjunction with the accompanying drawings and claims.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
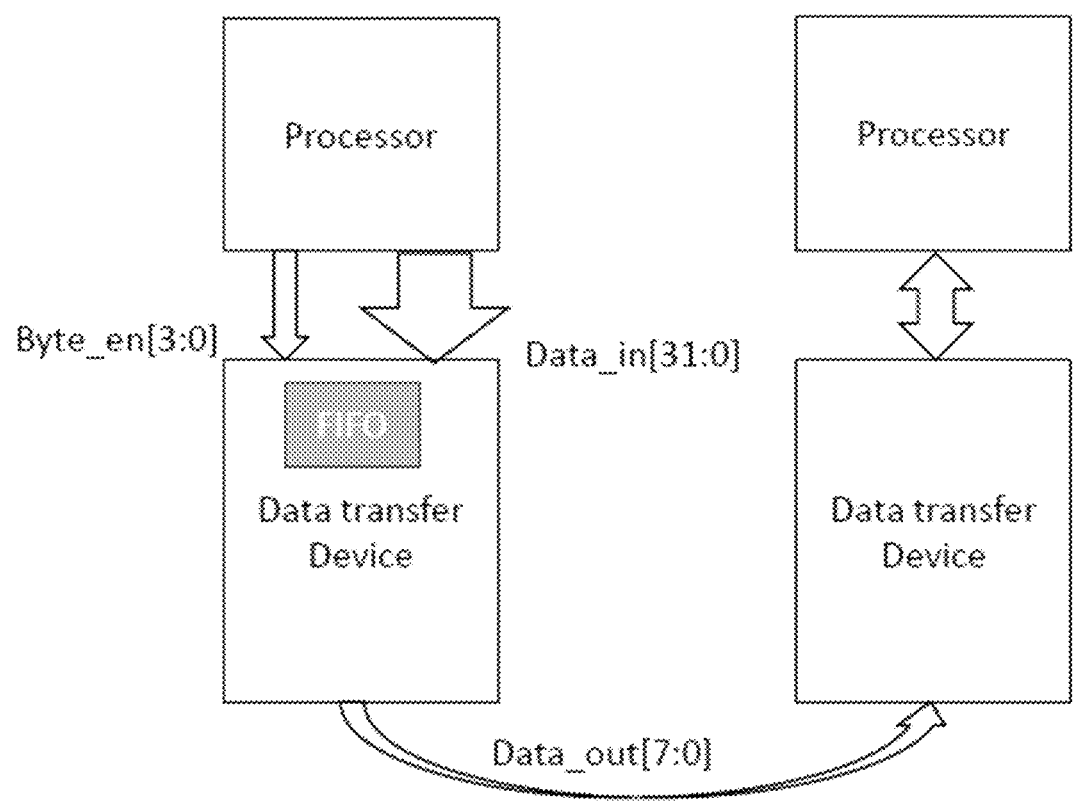
FIG. 1 illustrates an environment showing data transfer device in connection with a host device, in accordance with prior art.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

A data transfer device is used to receive data from a host device and transfer the data to another device. The received data may comprise multiple bytes and a byte enable bit may be associated with each byte. The byte enable bit may indicate if the corresponding byte is garbage data or not. If the byte enable is 0, then it represents that the corresponding byte is garbage data. On the other hand, if the byte enable bit is 1, then the corresponding byte is not garbage. In order to increase storage efficiency, the data transfer device should discard the garbage data. However, if the data transfer device selects the data with byte enable=1, in order to have storage efficiency, then more time is consumed in selecting the correct data. On the other hand, if device stores all the data including garbage, input speed is faster, but storage efficiency is affected.

In an embodiment, the present disclosure proposes a data transfer device with improved storage efficiency and input speed. In an embodiment, the present disclosure proposes to split the buffer unit of the data transfer device such as First-in-First-out (FIFO) into plurality of buffer units where each buffer unit is able to store 1 byte of data.

Figure 2:
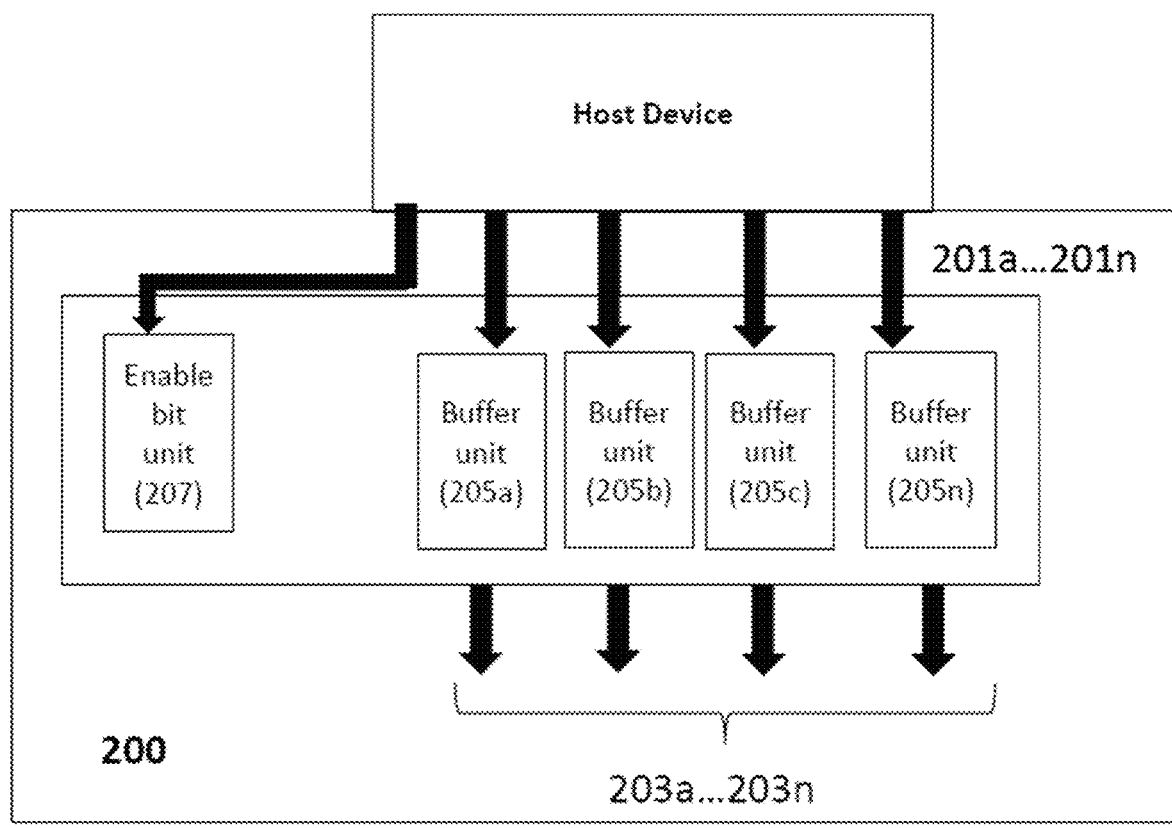
FIG. 2 illustrates a data transfer device in connection with a host device, in accordance with an embodiment of the present disclosure.

FIG. 2 illustrates a data transfer device in connection with a host device, in accordance with an embodiment of the present disclosure. In an embodiment, the data transfer device 200 may comprise a plurality of input ports (201*a* . . . 201*n*), a plurality of output ports (203*a* . . . 203*n*) and a plurality of buffer units (205*a* . . . 205*n*). The plurality of input ports (201*a* . . . 201*n*) are configured to receive input data where the input data comprises of a plurality of bytes. The plurality of output ports (203*a* . . . 203*n*) are configured to provide output data bytes. Each of the plurality of buffer units are coupled to an input port of the plurality of input ports and an output port of the plurality of output ports. In an embodiment, each of the plurality of buffer units (205*a* . . . 205*n*) receives a portion of the input data. An enable bit is associated with the portion of data. As discussed above, the enable bit may indicate if the portion of the data is garbage data or not. In an embodiment, if the enable bit is 0, then the portion of the data is garbage. On the other hand, if the enable bit is 1, then the portion of the data is not garbage. In an embodiment, each of the plurality of buffer units (205*a* . . . 205*n*) is capable of storing one byte only. Hence, in an embodiment, the portion of data is equal to 1 byte. Each of the plurality of buffer units provides the received portion of data as an output, if the enable bit indicates that the portion of data is not a garbage data.

In an embodiment, the data transfer device 200 may also comprise of an enable buffer unit 207 which receives and store the enable bit. In an embodiment, the enable buffer unit 207 may be coupled to the output ports and may enable the buffer units to discard the garbage byte data and provide the correct i.e. not garbage data, as an output. In an embodiment, the enable buffer unit 207 may be a FIFO. In a further embodiment, the enable buffer unit 207 may store the enable bit in a round robin fashion.

In a further embodiment, the data transfer device 200 may also comprise of a discard buffer unit (not shown for brevity). In an embodiment, the discard buffer unit may be coupled to the input ports. The discard buffer unit may discard the portion of data received at the buffer units, if it is a garbage data. This way the garbage data is not stored in the buffer units, which in turn helps in increasing the storage efficiency. buffer units to discard the garbage byte data and provide the correct i.e. not garbage data, as an output. In an embodiment, the discard buffer unit may be a FIFO. In a further embodiment, the discard buffer unit may discard the garbage data in a round robin fashion.

In an embodiment, as shown in FIG. 2, each of the plurality of buffer units is a First-in-First-Out (FIFO) device. It should be noted that any other device capable of storing a byte may be used as buffer unit.

In an embodiment, each of the plurality of buffer units receives the input data in a round robin fashion.

In an embodiment, a number of the plurality of buffer units is equal to a number of bytes in the input data. For example, if the input data is 32 bit i.e. 4 byte, then the data transfer device may comprise of 4 buffer units. Similarly, if the input data is 64 bit i.e. 8 byte, then the data transfer device may comprise of 8 buffer units.

In an embodiment, the host device is a processor. It should be noted that the host device may be any device capable of connecting with the data transfer device.

Figure 3:
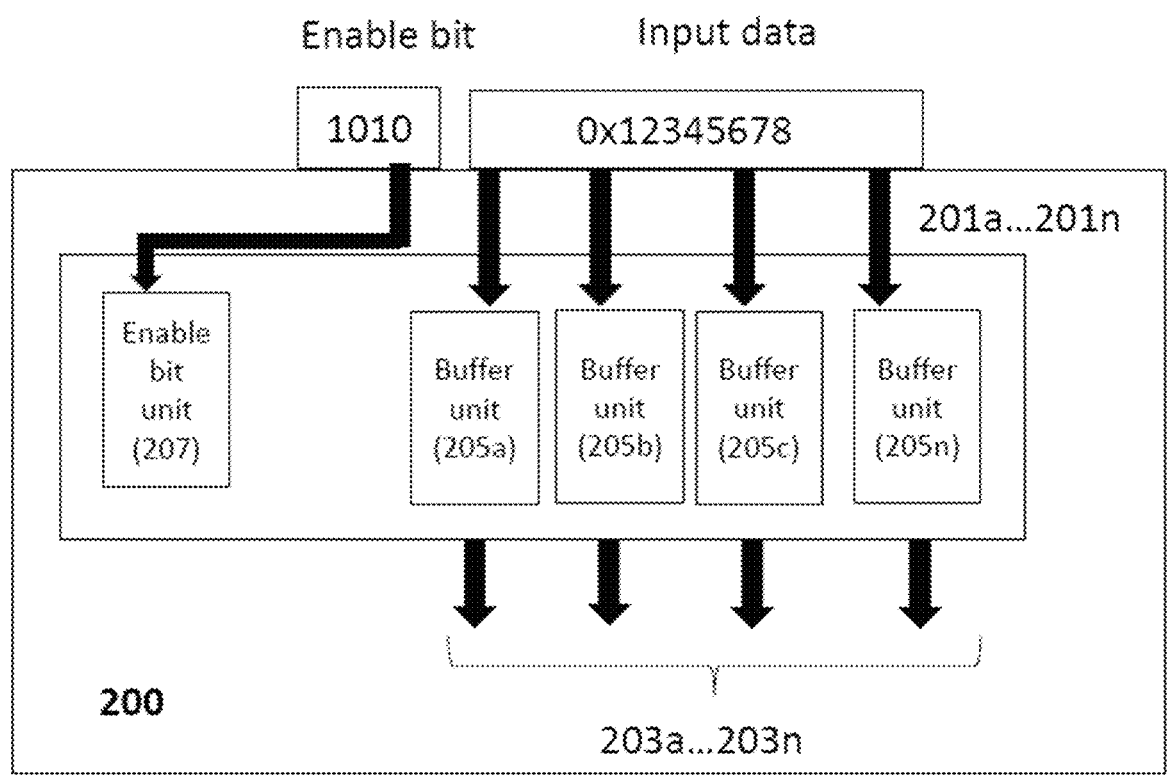
FIG. 3 illustrates an example of data transfer using the disclosed data transfer device, in accordance with an embodiment of the present disclosure.

FIG. 3 illustrates an example of data transfer using the disclosed data transfer device, in accordance with an embodiment of the present disclosure. For example, as shown in FIG. 3, the received data is 0x12345678 with enable bit as 1010. As the input data comprises 4 bytes, accordingly, the data transfer device also comprises 4 FIFOs. Enable bit associated with byte 12 is 1, which means that the byte 12 is not a garbage data. Accordingly, the corresponding byte 12 will be provided as an output by the corresponding FIFO. Similarly, byte 56 may be provided as an output by its corresponding then FIFO. On the other hand, the enable bit associated with bytes 34 and 78 is 0, which means that theses bytes are garbage data. Accordingly, the FIFOs receiving these bytes discards the bytes and do not provide an output.

This way, the data transfer device as disclosed in the present disclosure provides efficient storage (i.e. not required to store garbage data) with improved performance.

Although, the embodiments have been defined in respect of device-to-device data transfer, it is possible to transfer the data within a device between different layers using the data transfer device of the present disclosure. For example, the data transfer device may be used in uni-pro device, PCI devices which are layered protocol devices. The disclosed data transfer device may be used to transfer the data between the protocol layers of such devices.

Figure 4:
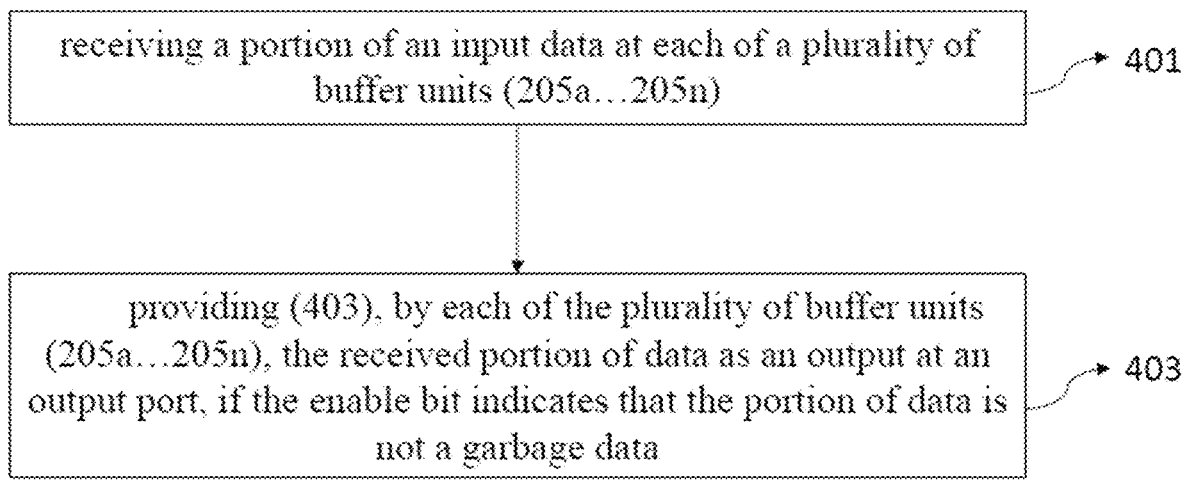
FIG. 4 illustrates a flow diagram depicting a method for receiving data from a host device, in accordance with an embodiment of the present disclosure.

FIG. 4 illustrates a flow diagram depicting a method for receiving data from a host device, in accordance with an embodiment of the present disclosure. As shown in FIG. 4, at step 401, the method 400 comprises receiving a portion of an input data at each of a plurality of buffer units, wherein the input data comprises of a plurality of bytes and wherein an enable bit is associated with the portion of data. Then, at step 403, the method 400 comprises providing, by each of the buffer devices, the received portion of data as an output at an output port, if the enable bit indicates that the portion of data is not a garbage data.

It should be noted that the method 400 performs all the functions of the data transfer device as discussed in respect of FIGS. 2 and 3.

Unless otherwise defined, all technical and scientific terms used herein have the same meaning as commonly understood by one of ordinary skill in the art to which this invention belongs. The apparatus, methods, and examples provided herein are illustrative only and not intended to be limiting.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A data transfer device for receiving data from a host device, comprising:
    a plurality of input ports configured to receive input data comprising of a plurality of bytes;
    a plurality of output ports configured to provide output data bytes;
    an enable buffer unit coupled to the plurality of output ports, wherein the enable buffer unit receives and store an enable bit; and
    a plurality of buffer units, each buffer unit directly coupled to an input port of the plurality of input ports and directly coupled to an output port of the plurality of output ports, wherein each of the plurality of buffer units receives a portion of the input data, wherein the enable bit is associated with the portion of data; and each of the plurality of buffer units provides the received portion of data as an output, if the enable bit indicates that the portion of data is not a garbage data, wherein a number of the plurality of buffer units is equal to a number of bytes in the input data.

2. The device as claimed in claim 1, wherein the enable buffer unit stores the enable bit in a round robin fashion.

3. The device as claimed in claim 1, further comprising: a discard buffer unit to discard the portion of data if it is a garbage data.

4. The device as claimed in claim 1, wherein each of the plurality of buffer units is a First-in-First-Out (FIFO) device.

5. The device as claimed in claim 1, wherein each of the plurality of buffer units receives the input data in a round robin fashion.

6. The device as claimed in claim 1, wherein each of the plurality of buffer units is capable of storing one byte of the input data.

7. A method for receiving data from a host device, comprising:
    receiving a portion of an input data at each of a plurality of buffer units, wherein each buffer unit of the plurality of buffer units is directly coupled to an input port of a plurality of input ports and an output port of a plurality of output ports, wherein the input data comprises of a plurality of bytes, wherein an enable bit is associated with the portion of data, wherein the enable bit is received and stored in an enable buffer unit coupled to the plurality of output ports, and wherein a number of the plurality of buffer units is equal to a number of bytes in the input data; and
    providing, by each of the plurality of buffer units, the received portion of data as an output at an output port, if the enable bit indicates that the portion of data is not a garbage data.

8. The method as claimed in claim 7, further comprising: storing the enable bit in a round robin fashion in the enable buffer unit.

9. The method as claimed in claim 7, further comprising: discarding the portion of data if it is a garbage data by a discard buffer unit.

10. The method as claimed in claim 7, wherein each of the plurality of buffer units is a First-in-First-Out (FIFO) device.

11. The method as claimed in claim 7, wherein each of the plurality of buffer units receives the input data in a round robin fashion.

12. The method as claimed in claim 7, wherein each of the plurality of buffer units is capable of storing one byte of the input data.

* * * * *